US011475133B2

(12) United States Patent
Shin et al.

(10) Patent No.: US 11,475,133 B2
(45) Date of Patent: Oct. 18, 2022

(54) METHOD FOR MACHINE LEARNING OF MALICIOUS CODE DETECTING MODEL AND METHOD FOR DETECTING MALICIOUS CODE USING THE SAME

(71) Applicant: SAMSUNG SDS CO., LTD., Seoul (KR)

(72) Inventors: Jang Mi Shin, Seoul (KR); Young Min Cho, Seoul (KR); Jung Bae Jun, Seoul (KR); Jang Ho Kim, Seoul (KR); Tae Jin Iyn, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 91 days.

(21) Appl. No.: 17/082,302

(22) Filed: Oct. 28, 2020

(65) Prior Publication Data

US 2021/0133323 A1    May 6, 2021

(30) Foreign Application Priority Data

Oct. 31, 2019    (KR) .......................... 10-2019-0137229

(51) Int. Cl.
G06F 21/55 (2013.01)
G06F 21/56 (2013.01)
H04L 9/40 (2022.01)

(52) U.S. Cl.
CPC .......... *G06F 21/566* (2013.01); *G06F 21/554* (2013.01); *G06F 21/563* (2013.01);
(Continued)

(58) Field of Classification Search
CPC .... G06F 21/566; G06F 21/554; G06F 21/563; G06F 21/56; G06F 21/55; H04L 9/40;
(Continued)

(56) References Cited

U.S. PATENT DOCUMENTS 8,028,301 B2 * 9/2011 Repasi ................... G06F 21/52
726/22
10,255,431 B2 * 4/2019 Amrilloev ............... G06F 17/16
(Continued)

FOREIGN PATENT DOCUMENTS

KR    10-2011-0128632 A    11/2011
KR    10-1472321 B1    12/2014
(Continued)

OTHER PUBLICATIONS

Qiao et al., "Analyzing Malware by Abstracting the Frequent Itemsets in API call Sequences", 2013 12th IEEE International Conference on Trust, Security and Privacy in Computing and Communications (Year: 2013).*

(Continued)

*Primary Examiner* — Jayesh M Jhaveri
(74) *Attorney, Agent, or Firm* — The PL Law Group, PLLC

(57) ABSTRACT

A method of training a malicious code detection model and a method of detecting a malicious code. The method includes acquiring application programming interface (API) call information of called functions from a result log of performing dynamic analysis of a malicious code, calculating time intervals between timestamps using the timestamps which indicate API call times extracted from the API call information, determining a feature value of the malicious code on the basis of the time intervals, and training the malicious code detection model using an API call sequence included in the API call information and the feature value.

10 Claims, 14 Drawing Sheets

(52) U.S. Cl.
CPC ...... *H04L 63/1408* (2013.01); *H04L 63/1425* (2013.01); *H04L 63/168* (2013.01)

(58) Field of Classification Search
CPC . H04L 63/14; H04L 63/1408; H04L 63/1425; H04L 63/168
See application file for complete search history.

(56) References Cited

U.S. PATENT DOCUMENTS

| | | | |
|---|---|---|---|
| 2008/0016339 A1* | 1/2008 | Shukla | G06F 21/54 713/164 |
| 2017/0270299 A1* | 9/2017 | Kim | G06N 5/022 |
| 2019/0065743 A1* | 2/2019 | Shibahara | G06F 21/56 |
| 2019/0114417 A1* | 4/2019 | Subbarayan | H04L 41/145 |
| 2019/0121977 A1* | 4/2019 | Gordeychik | G06F 21/552 |
| 2020/0285737 A1* | 9/2020 | Kraus | G06F 21/554 |

FOREIGN PATENT DOCUMENTS

| | | |
|---|---|---|
| KR | 10-2017-0108330 A | 9/2017 |
| KR | 10-1969572 B1 | 4/2019 |

OTHER PUBLICATIONS

Ni et al., "Real-time Detection of Malicious Behavior in Android Apps", 2016 International Conference on Advanced Cloud and Big Data (Year: 2016).*
Qiao et al., "CBM: Free, Automatic Malware Analysis Framework Using API Call Sequences", Conference paper—First Online: Jul. 24, 2013. (Year: 2013).*
Office action dated Apr. 21, 2021 from Korean Patent Office in a counterpart Korean Patent Application No. 10-2019-0137229 (all the cited references are listed in this IDS.) (English translation is also submitted herewith.).

* cited by examiner

| API | Score |
|---|---|
| NtQueryInformationJobObject | 39 |
| NtReadVirtualMemory | 38 |
| NtCreateProcessEx | 37 |
| NtQuerySection | 37 |
| NtWriteVirtualMemroy | 28 |

FIG. 3

| API | Time stamp | Time interval |
|---|---|---|
| Sleep | 73288 | 4485 |
| Sleep | 77773 | 1252 |
| Sleep | 79225 | 1075 |
| Sleep | 80100 | 2914 |
| Default LangID Get System | 83014 | 1234 |
| Directory Get System | 84248 | 61 |
| SetTimer | 84309 | 50 |
| SetTimer | 84359 | 1 |
| SetTimer | 84360 | 171 |
| Window Get Desktop | 84531 | 4 |
| Window Get Desktop | 84535 | 6 |
| SetTimer | 84541 | 6 |
| SetTimer | 84547 | 2346 |
| SetTimer | 86893 | 5 |
| SetTimer | 86898 | 1607 |
| SetTimer | 88505 | 4 |
| SetTimer | 88509 | 1444 |
| SetTimer | 89953 | 7 |
| SetTimer | 89960 | 1423 |
| SetTimer | 91383 | 1 |
| Window Get Desktop | 91384 | 73 |
| SetTimer | 91457 | 1438 |
| SetTimer | 92895 | 1369 |
| SetTimer | 94264 | 1365 |
| SetTimer | 95629 | 1387 |
| SetTimer | 97016 | 1367 |
| SetTimer | 98383 | 1367 |
| SetTimer | 99750 | 1367 |
| SetTimer | 101117 | 13770 |
| SetTimer | 114887 | 13667 |
| SetTimer | 128554 | 13750 |
| SetTimer | 142304 | 13729 |
| SetTimer | 156033 | |

| Number of time intervals (APIcalls-1) | INITIAL-STAGE LIST (NUMBER) | INTERMEDIATE-STAGE LIST (NUMBER) | LATE-STAGE LIST (NUMBER) |
|---|---|---|---|
| 3n | n | n | n |
| 3n+1 | n | n | n+1 |
| 3n+2 | n | n+1 | n+1 |

FIG. 10

| API | Time stamp | Time interval | |
|---|---|---|---|
| Sleep | 73288 | | |
| Sleep | 77773 | 4485 | |
| Sleep | 79225 | 1252 | |
| Sleep | 80100 | 1075 | 40' |
| Default LangID Get System | 83014 | 2914 | |
| Directory Get System | 84248 | 1234 | |
| SetTimer | 84309 | 61 | |
| SetTimer | 84359 | 50 | |
| SetTimer | 84360 | 1 | |
| Window Get Desktop | 84531 | 171 | |
| Window Get Desktop | 84535 | 4 | |
| SetTimer | 84541 | 6 | |
| SetTimer | 84547 | 6 | |
| SetTimer | 86893 | 2346 | |
| SetTimer | 86898 | 5 | |
| SetTimer | 88505 | 1607 | |
| SetTimer | 88509 | 4 | |
| SetTimer | 89953 | 1444 | |
| SetTimer | 89960 | 7 | 50' |
| SetTimer | 91383 | 1423 | |
| Window Get Desktop | 91384 | 1 | |
| SetTimer | 91457 | 73 | |
| SetTimer | 92895 | 1438 | |
| SetTimer | 94264 | 1369 | |
| SetTimer | 95629 | 1365 | |
| SetTimer | 97016 | 1387 | |
| SetTimer | 98383 | 1367 | |
| SetTimer | 99750 | 1367 | |
| SetTimer | 101117 | 1367 | |
| SetTimer | 114887 | 13770 | |
| SetTimer | 128554 | 13667 | 60' |
| SetTimer | 142304 | 13750 | |
| SetTimer | 156033 | 13729 | |

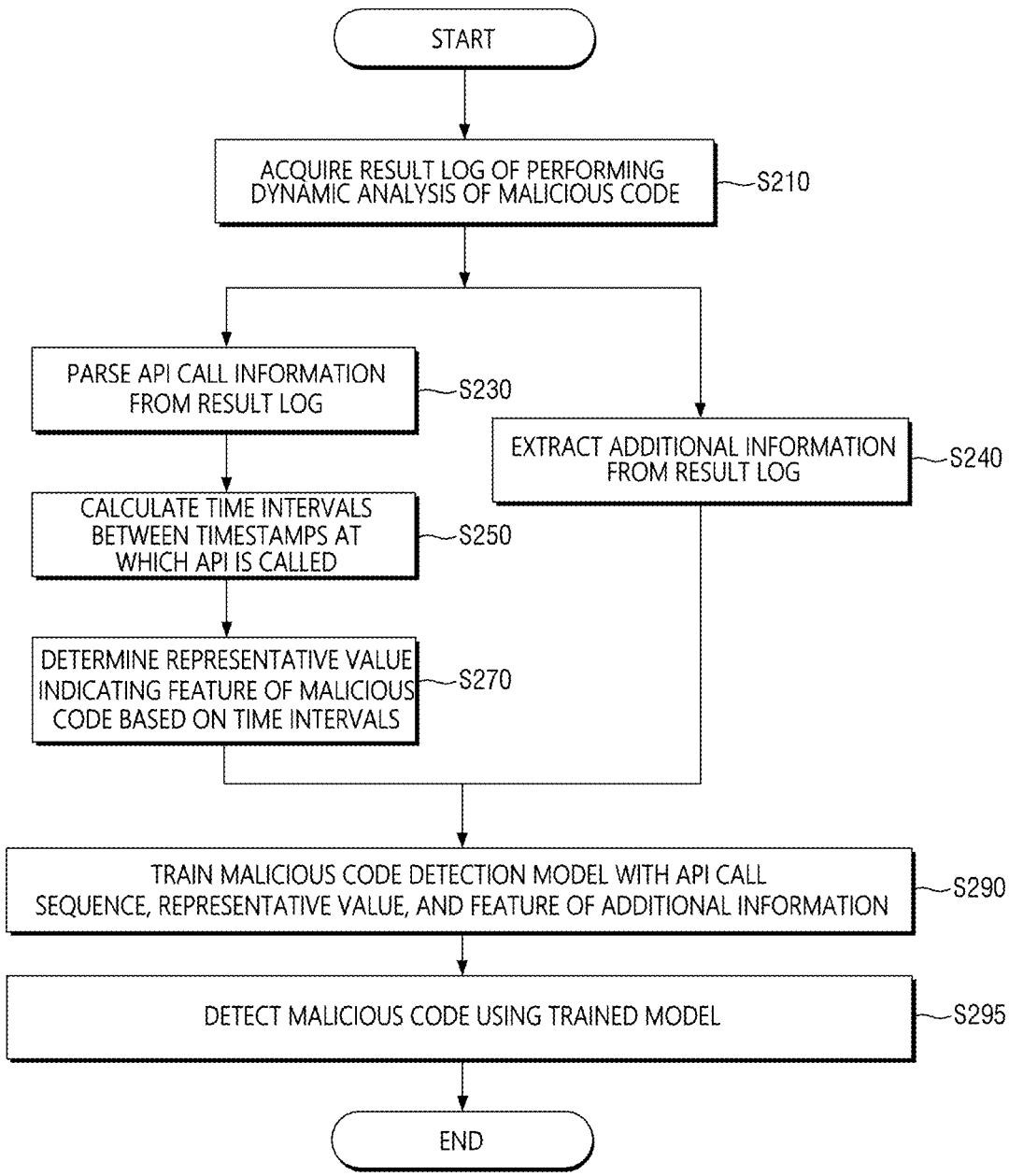

| MD5 | RESULT OF EXISTING ANALYSIS EQUIPMENT | RESULT OF MACHINE LEARNING | FINAL VERIFICATION |
|---|---|---|---|
| 01b6d419530539e53db924a13e76fb23 | NORMAL | MALICIOUS | MALICIOUS |
| 00751f6a37e29ec7dd78d1ddfb6428e2 | NORMAL | MALICIOUS | MALICIOUS |
| 01cb2729f7d73edd68721f6ec94cf1d8 | NORMAL | MALICIOUS | MALICIOUS |
| 17d895537c4eafa43ef4d4654f504365 | NORMAL | MALICIOUS | MALICIOUS |
| e1fea5c9db3aadc3217591e9a2ec8472 | NORMAL | MALICIOUS | MALICIOUS |

METHOD FOR MACHINE LEARNING OF MALICIOUS CODE DETECTING MODEL AND METHOD FOR DETECTING MALICIOUS CODE USING THE SAME

CROSS REFERENCE TO RELATED APPLICATION

This application claims priority from Korean Patent Application No. 10-2019-0137229 filed on Oct. 31, 2019 in the Korean Intellectual Property Office, and all the benefits accruing therefrom under 35 U.S.C. 119, the contents of which in their entirety are herein incorporated by reference.

BACKGROUND

1. Field

The present disclosure relates to a device and method for training a malicious code detection model. More particularly, the present disclosure relates to a malicious code detection model training device and method for detecting a malicious code by analyzing an application programming interface (API) function call time in a result log of performing dynamic analysis.

2. Description of the Related Art

Provided is a technology for conducting dynamic analysis on a suspicious code and detecting a malicious code using the analysis results. For example, a malicious code may be detected through API call information which is output as results of dynamic analysis. As shown in FIG. 1A, a malicious code may be detected on the basis of the score according to a call frequency (s) of each API function (a) called by a malicious code. Alternatively, as shown in FIG. 1B, the malicious code may be detected by analyzing a call sequence of API functions called by a malicious code.

However, the above-described malicious code detection technologies based on dynamic analysis have a problem in that a normal code which employs a function name identical or similar to a malicious code or calls functions in a pattern (p) similar to that of a malicious code is wrongly determined as the malicious code. Also, when a malicious code changes a function name or changes a pattern in various ways, such as lossy recovery or substitution of a part of the entire pattern, the malicious code may not be detected. Consequently, a technology is necessary to clearly identify features of a malicious code and detect the malicious code while using API call information of dynamic analysis.

SUMMARY

Aspects of the present disclosure provide a machine learning method and device of an artificial intelligence (AI) model for detecting a malicious code on the basis of a pattern according to call times of application programming interface (API) functions and a device and method for detecting a malicious code using the AI model.

Aspects of the present disclosure also provide a malicious code detection model training method and device for analyzing features of a malicious code, which gradually performs a malicious operation over time, in detail by analyzing the call times of API functions and learning the features of the malicious code and a malicious code detection method using the method and device.

Aspects of the present disclosure also provide a malicious code detection model training method and device for supplementing the shortcoming of an existing method by detecting a malicious code, which is not detected through existing dynamic analysis, even while using existing dynamic analysis and a malicious code detection method using the method and device.

Aspects of the present disclosure also provide a malicious code detection model training method and device which are applicable without a significant change in an existing detection model and a malicious code detection method using the method and device.

It should be noted that objects of the present disclosure are not limited to the above-described objects, and other objects of the present disclosure will be apparent to those skilled in the art from the following descriptions.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to an aspect of the inventive concept, there is provided a method of training a malicious code detection model. The method is performed by a computing device comprises acquiring application programming interface (API) call information of called functions from a result log of performing dynamic analysis of a malicious code, calculating time intervals between timestamps using the timestamps which indicate API call times extracted from the API call information, determining a feature value of the malicious code on the basis of the time intervals, and training the malicious code detection model using an API call sequence included in the API call information and the feature value.

According to another aspect of the inventive concept, there is provided a method, wherein the calculating of the time intervals comprises generating a list storing the API call sequence of a file for which malicious code detection is requested and the timestamps, and dividing the list into sections on the basis of the time intervals, wherein the determining of the feature value of the malicious code comprises analyzing the time intervals in each of the divided sections.

According to another aspect of the inventive concept, there is provided a method, wherein the dividing of the list into the sections comprises evenly dividing the list on the basis of the number of the time intervals.

According to another aspect of the inventive concept, there is provided a method, wherein the dividing of the list into the sections comprises evenly dividing the list into three sections on the basis of the number of the time intervals.

According to another aspect of the inventive concept, there is provided a method, wherein the dividing of the list into the sections comprises when the list is not evenly divided on the basis of a number of the time intervals, dividing the list into sections of arbitrary sizes, determining a feature value in each of the divided sections of the arbitrary sizes of the list, performing a simulation of detecting the malicious code using the feature values, measuring results of the simulation to determine optimal sizes for dividing the list, and dividing the list including the time intervals into sections of the optimal sizes for dividing the list.

According to another aspect of the inventive concept, there is provided a method, wherein the dividing of the list into the sections comprises setting a reference time interval on the basis of values of the time intervals and dividing the list into the sections on the basis of the reference time interval.

According to another aspect of the inventive concept, there is provided a method, wherein the feature value includes at least one of a maximum value of the time intervals, an average value of the time intervals, and a standard deviation of the time intervals in the list including the time intervals.

According to another aspect of the inventive concept, there is provided a method, wherein the determining of the feature value indicating a feature of the malicious code comprises additionally using additional information of a file, for which malicious code detection is requested, in the result log of performing the dynamic analysis to determine the feature value.

According to another aspect of the inventive concept, there is provided a method, wherein the additional information includes at least one of types or a number of changes of dynamic-link libraries (dlls), a number of changes in a process identifier (ID), a central processing unit (CPU) value, or telemetry data.

According to another aspect of the inventive concept, there is provided a method, further comprising performing a preprocess of unifying names of functions which are determined to be similar functions among functions included in the API call information.

According to another aspect of the inventive concept, there is provided a method of detecting a malicious code performed by a computing device. The method comprises acquiring application programming interface (API) call information of called functions from a result log of performing dynamic analysis of a malicious code, calculating time intervals between timestamps using the timestamps which indicate API call times extracted from the API call information, determining a feature value indicating a feature of the malicious code on the basis of the time intervals, and detecting the malicious code in a file, for which malicious code detection is requested, through a malicious code detection model, wherein the malicious code detection model learns the feature value of the malicious code using an API call sequence included in the API call information and the feature value.

According to another aspect of the inventive concept, there is provided a device for training a malicious code detection model. The device comprises a processor, a network interface, a memory, and a computer program configured to be loaded to the memory and executed by the processor, wherein the computer program comprises, an instruction to acquire application programming interface (API) call information of called functions from a result log of performing dynamic analysis of a malicious code, an instruction to calculate time intervals between timestamps using the timestamps which indicate API call times extracted from the API call information, an instruction to determine a feature value of the malicious code on the basis of the time intervals, and an instruction to train a malicious code detection model using an API call sequence included in the API call information and the feature value.

According to another aspect of the inventive concept, there is provided a device wherein the instruction to calculate the time intervals comprises an instruction to generate a list storing the API call sequence of a file for which malicious code detection is requested and the timestamps, and an instruction to divide the list into sections on the basis of the time intervals, wherein the instruction to determine the feature value of the malicious code comprises analyzing the time intervals in each of the divided sections.

According to another aspect of the inventive concept, there is provided a device, wherein the instruction to divide the list into the sections comprises an instruction to evenly divide the list on the basis of a number of the time intervals.

According to another aspect of the inventive concept, there is provided a device, wherein the instruction to divide the list into the sections comprises an instruction to evenly divide the list into three sections on the basis of the number of the time intervals.

According to another aspect of the inventive concept, there is provided a device, wherein the instruction to divide the list into the sections comprises an instruction to divide the list into sections of arbitrary sizes when the list is not evenly divided on the basis of a number of the time intervals, an instruction to determine a feature value in each of the divided sections of the arbitrary sizes of the list, an instruction to perform a simulation of detecting the malicious code using the feature values, an instruction to determine an optimal size for dividing the list by measuring results of the simulation, and an instruction to divide the list including the time intervals into sections of the optimal size for dividing the list.

According to another aspect of the inventive concept, there is provided a device, wherein the instruction to divide the list into the sections comprises an instruction to set a reference time interval on the basis of values of the time intervals and divide the list into the sections on the basis of the reference time interval.

According to another aspect of the inventive concept, there is provided a device, wherein the feature value includes at least one of a maximum value of the time intervals, an average value of the time intervals, and a standard deviation of the time intervals in the list including the time intervals.

According to another aspect of the inventive concept, there is provided a device, wherein the instruction to determine the feature value of the malicious code comprises an instruction to determine the feature value additionally using additional information of a file, for which malicious code detection is requested, in the result log of performing the dynamic analysis.

According to another aspect of the inventive concept, there is provided a device, further comprising an instruction to perform a preprocess of unifying names of functions which are determined to be similar functions among functions included in the API call information.

BRIEF DESCRIPTION OF THE DRAWINGS

The above and other aspects and features of the present disclosure will become more apparent by describing in detail exemplary embodiments thereof with reference to the attached drawings, in which:

FIG. 3 shows a list including time intervals generated by the method of training a malicious code detection model;

FIG. 10 exemplifies a list divided according to FIG. 9;

FIG. 12 is a flowchart illustrating a method of detecting a malicious code according to another exemplary embodiment of the present disclosure;

DETAILED DESCRIPTION

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. The configuration and operation of a prototype testing system according to an embodiment will be described with reference to FIG. 2.

Figures 1A, 1B:
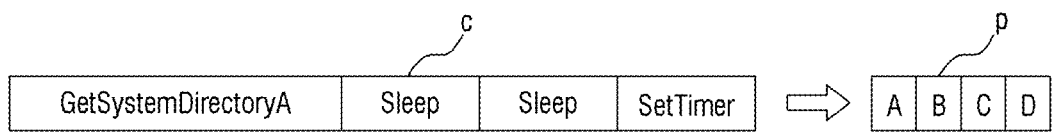
FIGS. 1A and 1B illustrate characteristics of functions used in a method of training a malicious code detection model according to a related art.
Figure 2:
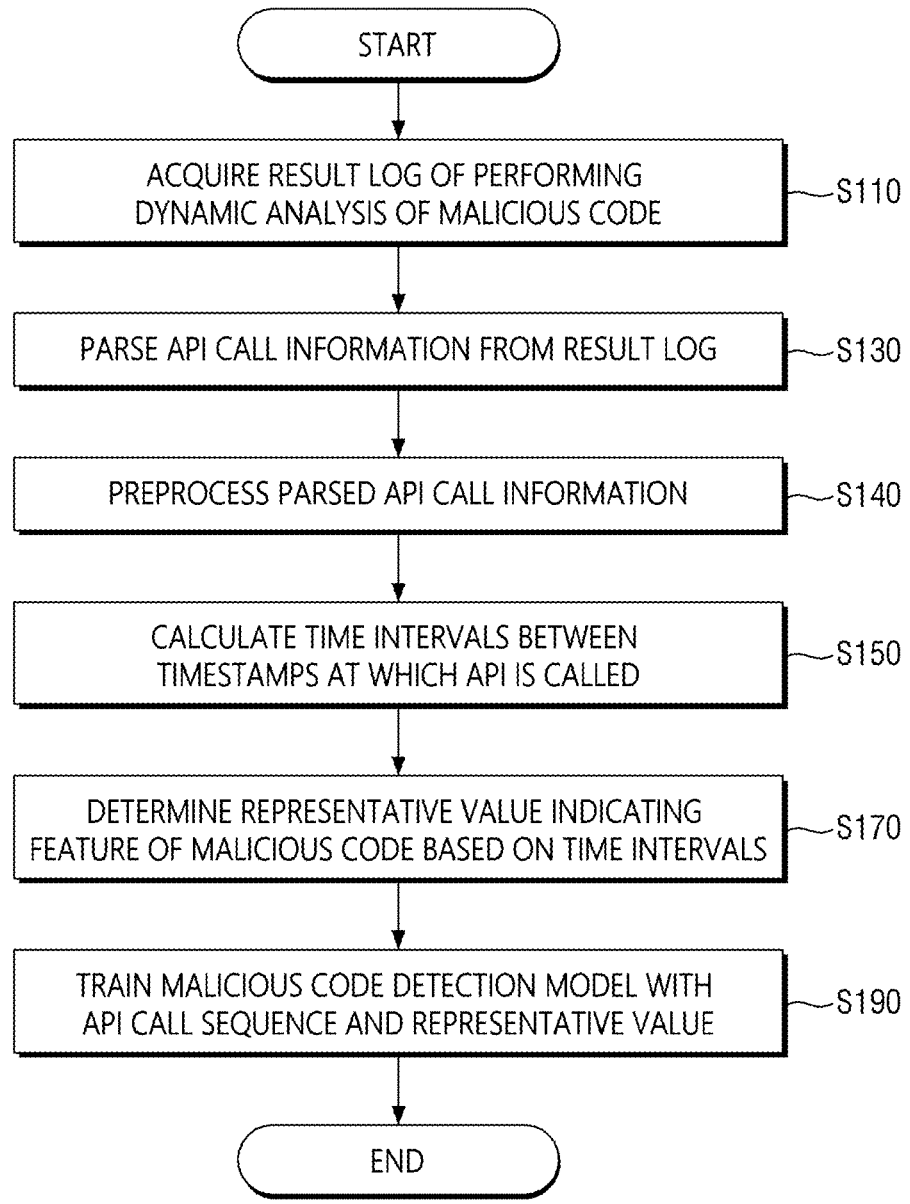
FIG. 2 is a flowchart of a method of training a malicious code detection model according to an exemplary embodiment of the present disclosure.

FIG. 2 is a flowchart of a method of training a malicious code detection model according to an exemplary embodiment of the present disclosure. The malicious code detection model training method according to the exemplary embodiment may be performed by a computing device. All operations of the method according to the exemplary embodiment may be performed by one computing device. However, some operations pertaining to the method according to the exemplary embodiment may be performed by a first computing device, and other operations may be performed by a second computing device. When the subject of an operation pertaining to the method according to the exemplary embodiment is omitted, the subject may be construed as the computing device.

Referring to FIG. 2, in the malicious code detection model training method of the present disclosure, a malicious code may be detected using a timestamp extracted from a result log of dynamic analysis of a file.

Specifically, in an operation S110, a result log is obtained, the obtained result log is for performing dynamic analysis of a malicious code performed with respect to a file for which malicious code detection is requested. The file for which malicious code detection is requested may be in the portable executable (PE) format. However, the file is not limited to the format and may be changed to various formats in which malicious codes may be detected. Dynamic analysis of the malicious code may be performed in advance with respect to the file for which malicious code detection is requested, and a result log of performing the dynamic analysis may be collected.

The dynamic analysis is a method of training a malicious code detection model which may output a result log and may be an operation performed before the malicious code detection model training method of the present disclosure is performed. The dynamic analysis may be performed in a sandbox so that any security problem caused by operation of the malicious code may be prevented from affecting an external system. However, the dynamic analysis is not limited to any one dynamic analysis method and may be performed in various ways of outputting a result log. There is no limitation in a subject which performs the dynamic analysis.

In other words, the dynamic analysis may be performed in a first device which performs the malicious code detection model training method of the present disclosure or may be performed in a second device rather than the first device. That is, a result log obtained through the dynamic analysis may be acquired from any one of the first device and the second device.

The result log is data output through the dynamic analysis and may be data including analysis results of a process, a network, a registry, and a called function of the file for which malicious code detection is requested. The result log is not limited to these types of data and may include various types of information that may be acquired through the dynamic analysis.

In an operation S130, application programming interface (API) call information indicating a function called by the file may be parsed from the result log. The API call information may be information related to API functions included in the result log such as the names of the API functions called by the file for which malicious code detection is requested and timestamps indicating information on times at which the API functions are called.

In an operation S140, data contained in the parsed API call information may be preprocessed. A malicious code may operate in different API function names even when including an API function performing the same operation. Therefore, in this operation, the names of functions which perform identical or similar operations may be preprocessed in similar forms. This operation S140 will be described in further detail below with reference to FIGS. 11A and 11B.

In an operation S150, timestamps indicating API call times may be extracted from the API call information. Time intervals between timestamps may be calculated using the extracted timestamps. In this operation, a list may be generated to store the extracted API function names and the timestamps, and the timestamps may be used to calculate time intervals. This will be described in detail below with reference to FIG. 3.

FIG. 3 shows a list 1 including time intervals 30 generated by the malicious code detection model training method. As shown in FIG. 3, an API call sequence 10 in which API function names are arranged and timestamps 20 indicating times at which individual functions are called may be extracted and stored in the list 1 generated in the operation S150.

The list 1 may be generated as a linked list or an array list. However, the list 1 is not limited to such a structure and may be changed to various structures for storing API function names and the timestamps 20. The list 1 may store API function names in order of API calls and also the timestamps 20 indicating times at which the corresponding functions are called. In this operation, when API function names and the timestamps 20 are stored in the list 1, the time intervals 30 between the timestamps 20 may be calculated.

Referring back to FIG. 2, in the operation S150, the list 1 may be divided into sections. The list 1 may be divided on the basis of the number of calls in the API call sequence 10 or the time intervals 30. Division of the list 1 will be described in detail below with reference to FIG. 4.

Figures 4, 5:
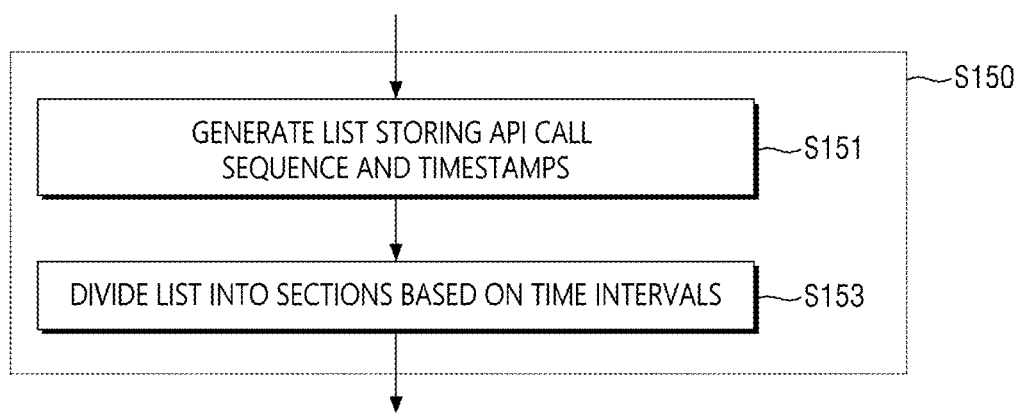
FIG. 4 is a flowchart illustrating, in further detail, some operations of the malicious code detection model training method illustrated in FIG. 2.
FIG. 5 illustrates an exemplary embodiment of dividing a list.

Referring to FIG. 4, in an operation S151, the list 1 may be generated. The list 1 may store the API call sequence 10 of API functions called by the file and the timestamps 20. In an operation S153, the list 1 may be divided into sections on the basis of the time intervals 30. In other words, in this operation, several time intervals 30 may be grouped. Grouping of the time intervals 30 will be described in detail below with reference to FIGS. 6 to 10.

In an operation S170, a representative value indicating a feature of a malicious code is determined on the basis of the time intervals 30. This will be described in detail with reference to FIG. 8.

In an operation S190, the malicious code detection model may be trained with the API call sequence 10 included in the API call information and the feature value. In this operation, machine learning may be performed using the API call sequence 10 and the feature value as features. The machine learning algorithm may be implemented in various well-known ways, and description thereof will be omitted so as not to obscure the gist of the present disclosure.

According to the malicious code detection model training method described above with reference to FIG. 2, the call times of API functions are analyzed to learn features of a malicious code, and thus the features of the malicious code, which gradually performs a malicious operation over time, can be analyzed in detail. Also, according to the malicious code detection model training method of the present disclosure, it is possible to detect a malicious code which is not detected through existing dynamic analysis and is applicable without significant change in an existing detection model. Therefore, application of the method does not significantly increase costs while remarkably improving detection performance.

The effects and technical meanings of the malicious code detection model training method according to the exemplary embodiment will be described below.

Most malicious code creators create a variety of variant malicious codes rather than one malicious code and attempt attacks in order to avoid detection by an antivirus program. For example, a malicious code creator makes a change such as using a substitutive function instead of an API function used in an existing malicious code. In this case, the action or function of the malicious code is not changed much. However, the code is required to proceed according to the creator's intention, and thus even the variant shows a similar pattern in the call times or call time intervals of a function. Therefore, it is meaningful to derive a feature value from the call times of a function and use the feature value in malicious code detection. Also, a pattern which is generated using the call time intervals of a function may be an important criterion for malicious code analyzers' analyses (e.g., determinations of the sameness among creators of individual malicious codes).

FIG. 5 illustrates that the list is divided into a plurality of sections according to some exemplary embodiments.

Referring to FIG. 5, the number intN of time intervals 30 may be smaller than the total number of API calls by one. In this case, the total number of API calls is equal to the total number of calls included in the API call sequence 10.

According to the exemplary embodiment, in the operation S153, the list 1 may be evenly divided on the basis of the number of time intervals 30. According to the exemplary embodiment, the list 1 may be evenly divided into three sections 40, 50, and 60 on the basis of the number of time intervals 30. Since the list 1 is divided on the basis of the time intervals 30 according to the method of the present disclosure, the list 1 including the time intervals 30 may be divided into an initial stage in which the malicious code analyzes surroundings before performing a malicious operation, an intermediate stage in which the malicious code performs a malicious operation, and a late stage in which the malicious code finishes the malicious operation.

For example, when the total number of API calls is 3n+1, the number of time intervals 30, that is, 3n, is evenly divided so that an initial-stage list number 40, an intermediate-stage list number 50, and a late-stage list number 60 may all be n. A case in which the list 1 is not evenly divided will be described with reference to FIG. 6.

Figure 6:
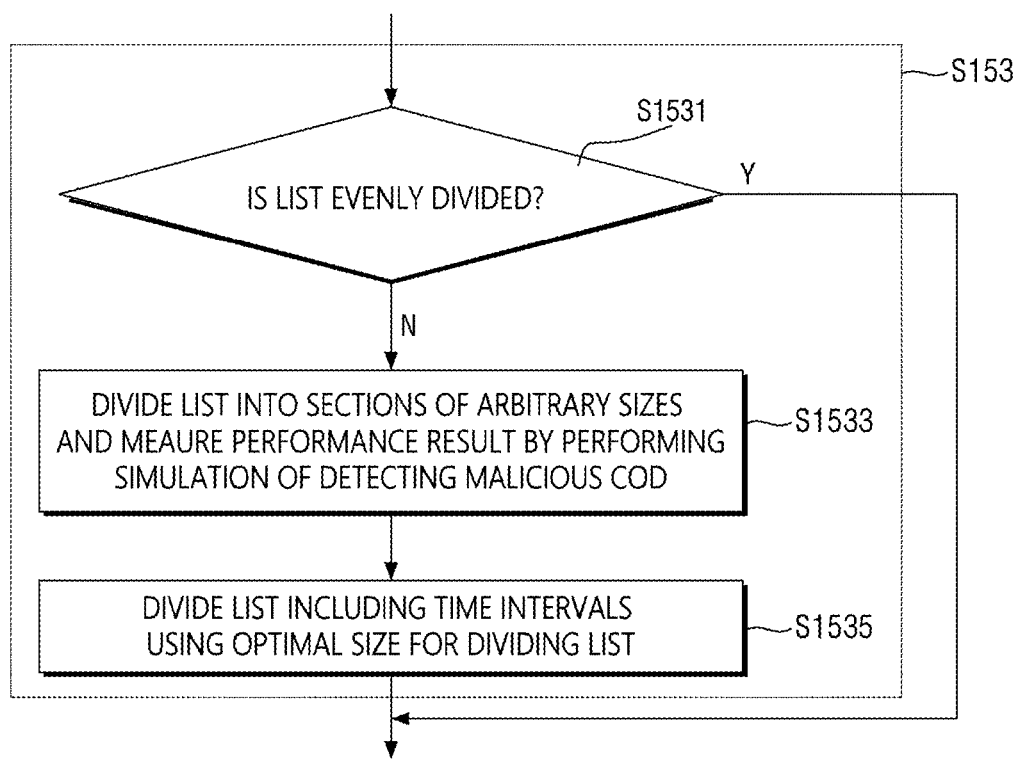
FIG. 6 is a flowchart illustrating another exemplary embodiment of dividing a list.
Figure 7:
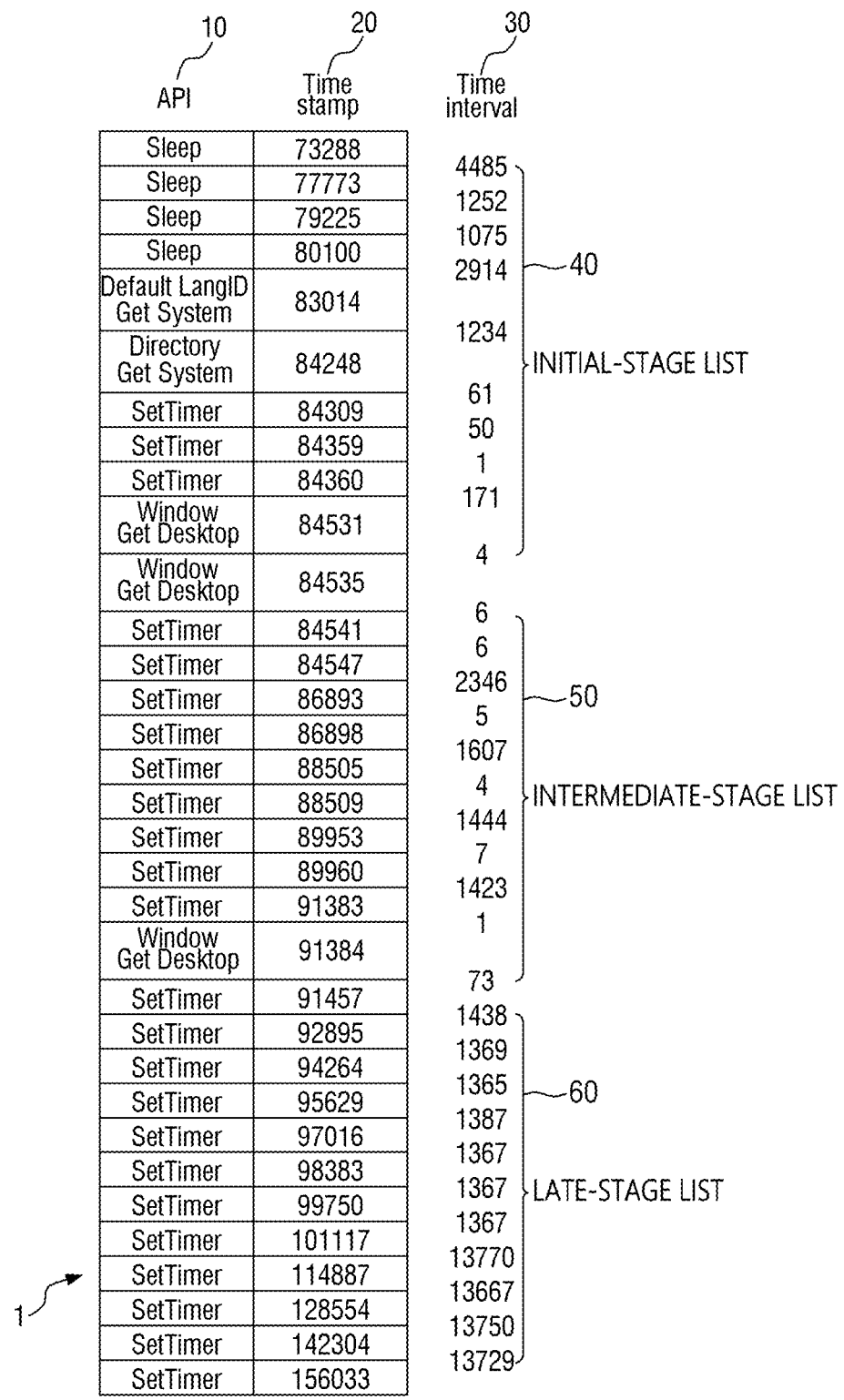
FIG. 7 exemplifies a list divided according to some exemplary embodiments of the present disclosure.
Figure 8:
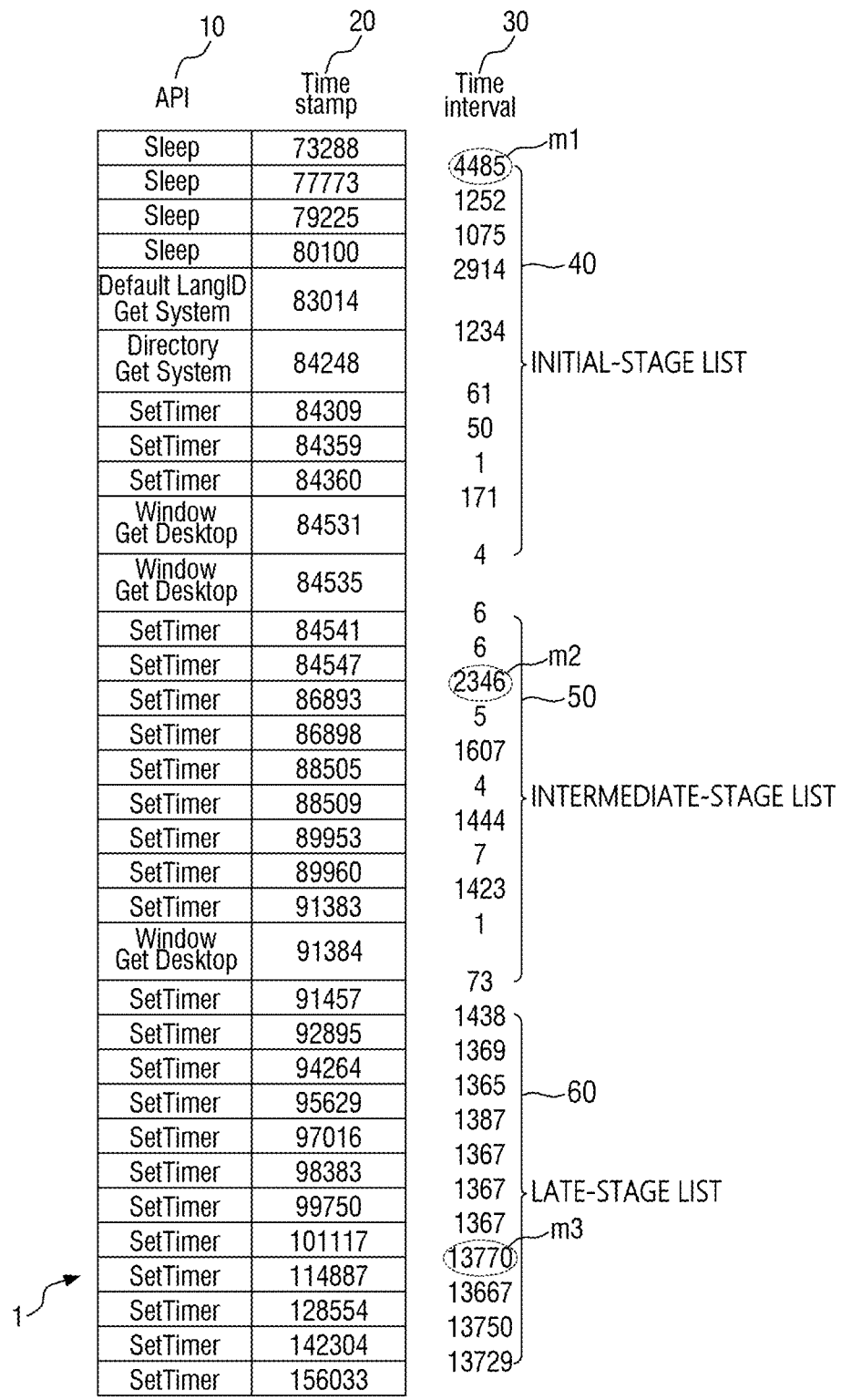
FIG. 8 illustrates a method of determining a feature value of time intervals.

FIG. 6 is a flowchart illustrating another exemplary embodiment of dividing a list, FIG. 7 exemplifies a list divided according to some exemplary embodiments of the present disclosure, and FIG. 8 illustrates a method of determining a feature value of time intervals.

In an operation S1531 of FIG. 6, whether the list 1 is evenly divided according to the number of time intervals 30 may be determined. When it is determined in this operation that the list 1 is evenly divided according to the number of time intervals 30, the operations S170 and S190 may be performed. When it is determined that the list 1 is not evenly divided, in an operation S1533, the list 1 is divided into sections of arbitrary sizes, and a feature value may be determined in each of the divided sections of the arbitrary sizes of the list 1 so that a simulation of detecting a malicious code may be performed. Also, simulation results may be measured in this operation so that an optimal size for dividing the list 1 may be determined.

In an operation S1535, sections may be adjusted so that the list 1 may be divided into sizes which bring optimal performance results. For example, when the total number of API calls is 3n+2, it is difficult to evenly divide the number of time intervals 30, that is, 3n+1, into three sections. Therefore, the initial-stage list number 40 may be n, the intermediate-stage list number 50 may be n, and the late-stage list number 60 may be n+1.

According to another exemplary embodiment, when the total number of API calls is 3n+3, it is difficult to evenly divide the number of time intervals 30, that is, 3n+2, into three sections. Therefore, the initial-stage list number 40 may be n, the intermediate-stage list number 50 may be n+1, and the late-stage list number 60 may be n+.

In this way, an optimal size for outputting optimal performance results may be determined through simulation in the operation S1533, and sections may be adjusted according to the optimal size in the operation S1535.

Referring to FIG. 7, the list 1 may store the API call sequence 10 acquired from the API call information, the timestamps 20 of individual API calls, and the time intervals 30 between the timestamps 20.

In the list 1, the total number of API calls is 33, and the number of time intervals 30 are 32, that is, 3n+2. The initial-stage list number 40 may be n, the intermediate-stage list number 50 may be n+1, and the late-stage list number 60 may be n+1. Since n equals 10, the initial-stage list number 40 may be 10, the intermediate-stage list number 50 may be 11, and the late-stage list number 60 may be 11.

Referring to FIG. 8, the time intervals 30 may be used in the list 1 of FIG. 7 to determine feature values. The feature values determined in the operation S170 may include at least one of the maximum, average, and standard deviation of the time intervals 30 in the time list 1.

In the initial section 40, the interval between the timestamps 20, that is, the time interval 30, between "Sleep" functions called at the beginning is 4485 which is analyzed to be a maximum m1. In the initial section 40, an average time interval is analyzed to be 1124.7, and a standard deviation is analyzed to be 1422.62.

In the intermediate section 50, the time interval 30 between called "SetTimer" functions is 2346 which is analyzed to be a maximum m2. An average time interval is analyzed to be 629.27, and a standard deviation is analyzed to be 844.54.

In the late section 60, the time interval 30 between called "SetTimer" functions is 13770 which is analyzed to be a maximum m3. An average time interval is analyzed to be 5470.54, and a standard deviation is analyzed to be 5940.51.

According to another exemplary embodiment, feature values may further include additional information of the file, for which malicious code detection is requested, acquired from the result log of performing the dynamic analysis, and the malicious code detection model may be trained additionally with the feature values of the additional information.

Figure 9:
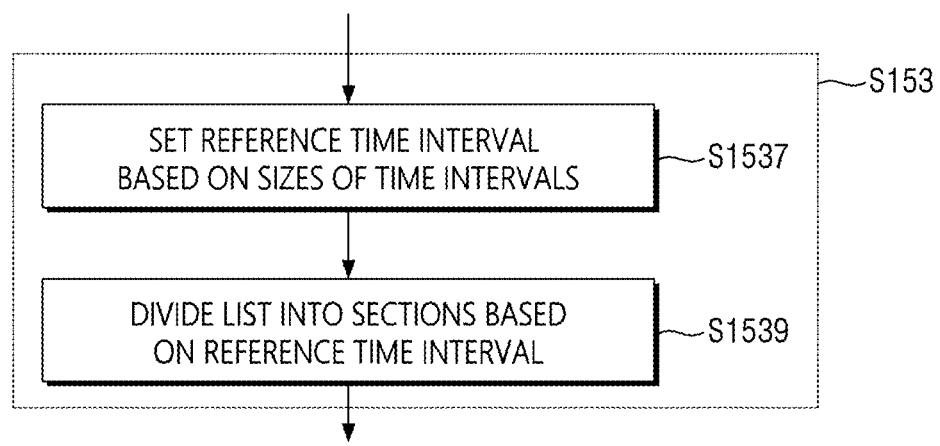
FIG. 9 is a flowchart illustrating another exemplary embodiment of dividing a list.

FIG. 9 is a flowchart illustrating another exemplary embodiment of dividing a list, and FIG. 10 exemplifies a list divided according to FIG. 9.

Referring to FIG. 9, when the list 1 is divided into sections in the operation S153 of FIG. 4, the list 1 may be divided on the basis of the values of the time intervals 30. Specifically, in an operation S1537, a reference time interval 30 may be set on the basis of the values of the time intervals 30. A drastic increase in the time intervals 30 may indicate a high probability that a function has been called and an operation has been performed in the function, and various operations having been performed may indicate a probability that a suspicious operation has been performed. According to the exemplary embodiment, when the time interval 30 is drastically increased or reduced in the list 1, the corresponding time interval 30 may be set as a reference time interval. Subsequently, in an operation S1539, the list 1 may be divided into sections on the basis of reference time intervals.

Referring to FIG. 10, the time interval 30 is drastically reduced from 1234 to 61 in the section between the fifth function "get system Default laneID" and the function "SetTimer." Therefore, in the operation S1537, the section is determined to be a reference time interval, which may be set as the boundary between an initial section and an intermediate section. In the intermediate section and a late section, the time interval 30 is drastically increased from 1367 to 13770 while the "SetTimer" function is repeated called. In the operation S1537, the corresponding section may be set as the boundary between the intermediate section and the late section.

Subsequently, in the operation S1539, the list 1 may be divided on the basis of the reference time intervals. Therefore, in the case of dividing the list 1 into sections according to the exemplary embodiment, the list 1 including the time intervals 30 may be divided by the malicious code detection model training method of the present disclosure into an initial stage in which the malicious code analyzes surroundings before performing a malicious operation, an intermediate stage in which the malicious code performs a malicious operation, and a late stage in which the malicious code finishes the malicious operation, FIG. 11A shows data included in parsed API call information before preprocessing, and FIG. 11B shows the data after preprocessing.

Figure 11A:
FIGS. 11A and 11B show data included in parsed application programming interface (API) call information before preprocessing and after preprocessing, respectively.

Referring to FIG. 11A, as an example of data obtained by parsing the result log of performing dynamic analysis, each piece of data may be distinguished by "☐" or "." Even API functions having the same function may have different API names to support multiple languages, and even identical API functions of a version and an extended version may have different API names such as "MessageBox" and "MessageBoxA" or "Sleep" and "SleepEx."

Figure 11B:
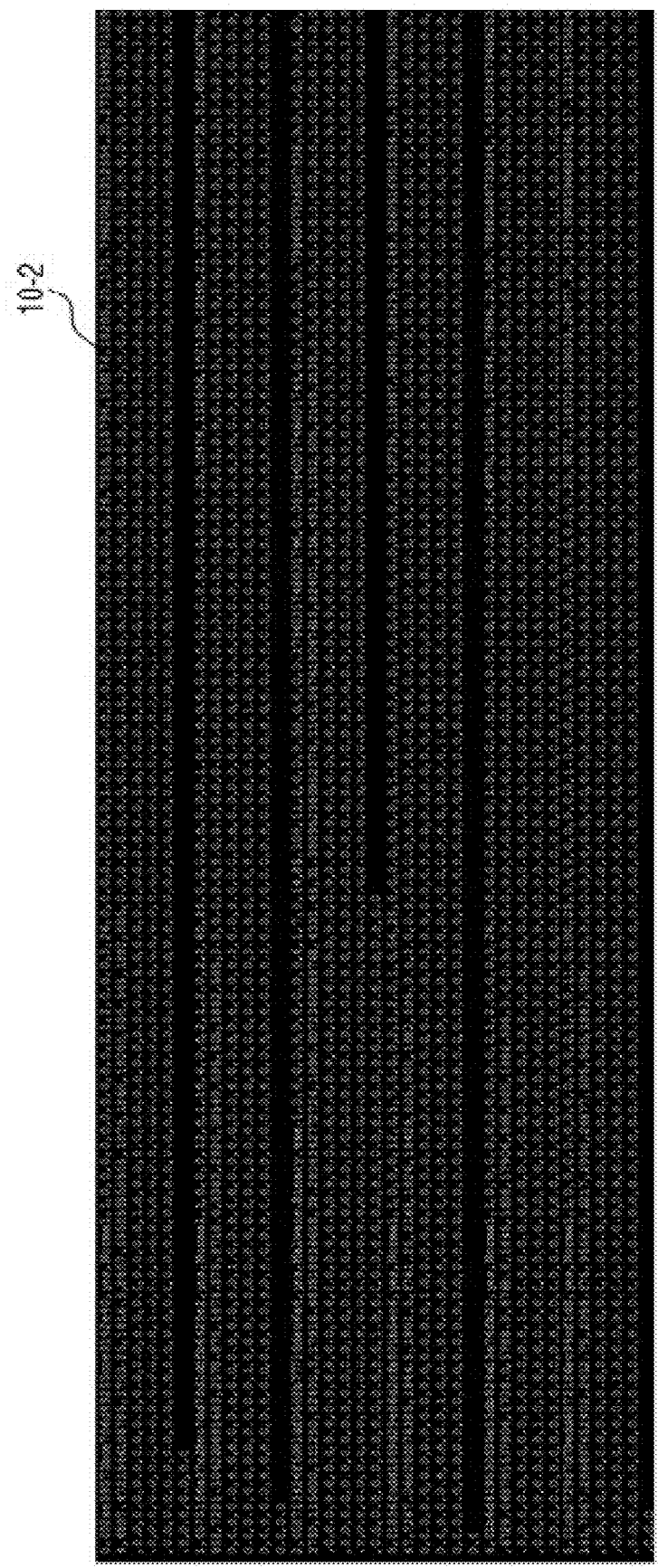

Referring to FIG. 11B, the names of functions determined to be similar functions may be unified among functions included in the parsed API call information. A function grouping table may be set in advance to determine similar functions, or when function names are identical at a preset probability or more, in this operation, "☐" distinguishing values in the data may be changed to ".", and identical functions are preprocessed to have the same function name.

FIG. 12 is a flowchart illustrating a method of detecting a malicious code according to another exemplary embodiment of the present disclosure.

Referring to FIG. 12, according to the malicious code detection method, a model trained through the above-described malicious code detection model training method may be used to detect a malicious code. Specifically, in an operation S210, a result log may be obtained by performing dynamic analysis of a malicious code in the file for which malicious code detection is requested. Subsequently, in an operation S230, API call information of functions called by a file may be parsed from the result log.

In an operation S250, time intervals between timestamps may be calculated using the timestamps indicating API call times extracted from the API call information. In an operation S270, a feature value indicating a feature of the malicious code may be determined on the basis of the time intervals. In this case, in an operation S240, the feature value may be determined from the result log of performing the dynamic analysis using additional information of the file for which malicious code detection is requested. The additional information may include dynamic-link libraries (dlls) (types and the number of changes), process identifiers (IDs) (the number of changes), central processing unit (CPU) values, or telemetry data.

In an operation S290, the malicious code detection model may be trained with an API call sequence and the feature value, and in an operation S295, the malicious code detection model may be used to detect a malicious code in the file.

Figure 13:
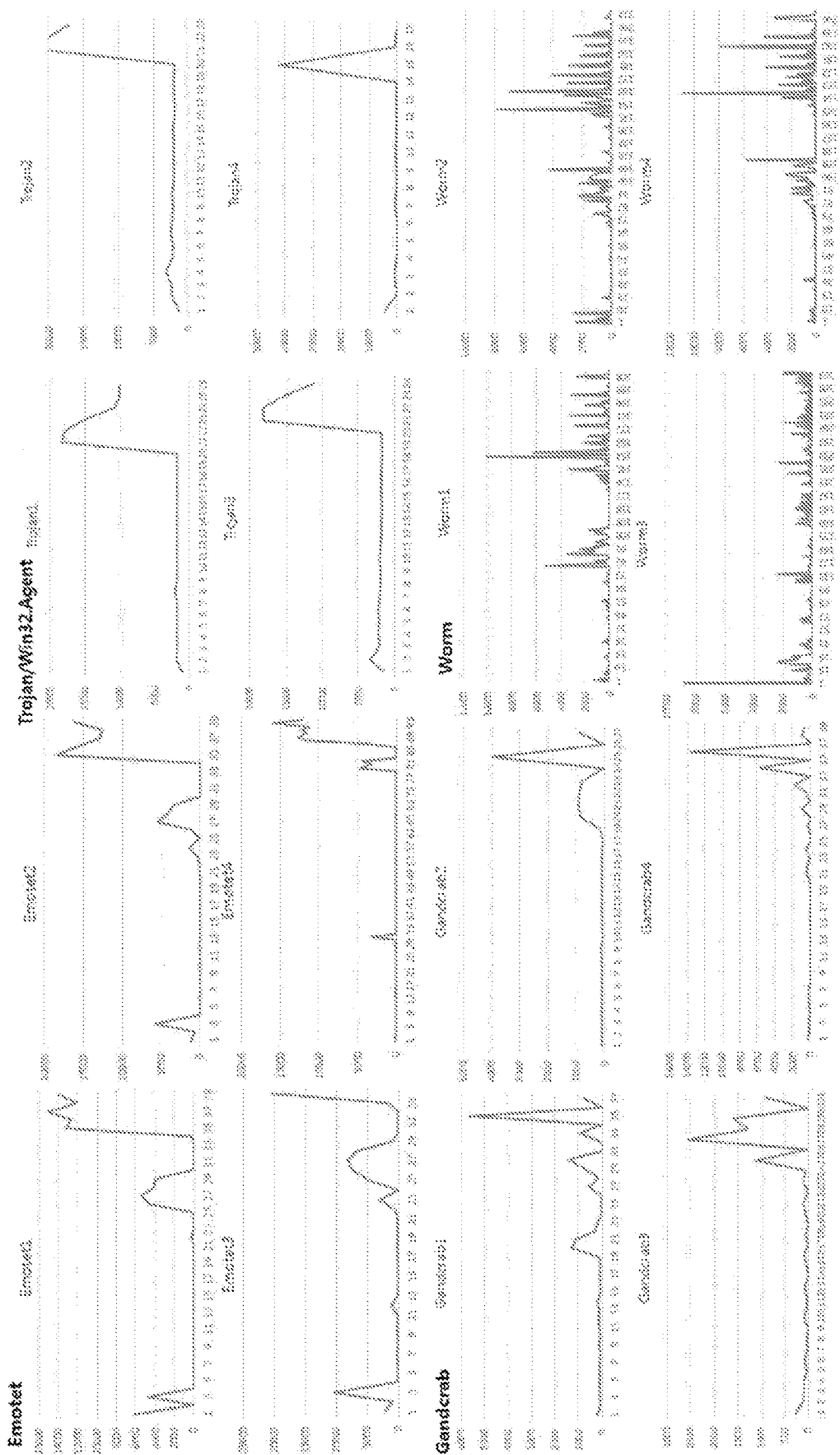
FIG. 13 is a set of graphs illustrating analysis results of malicious codes and time intervals detected by the malicious code detection method of the present disclosure.
Figures 14, 15:
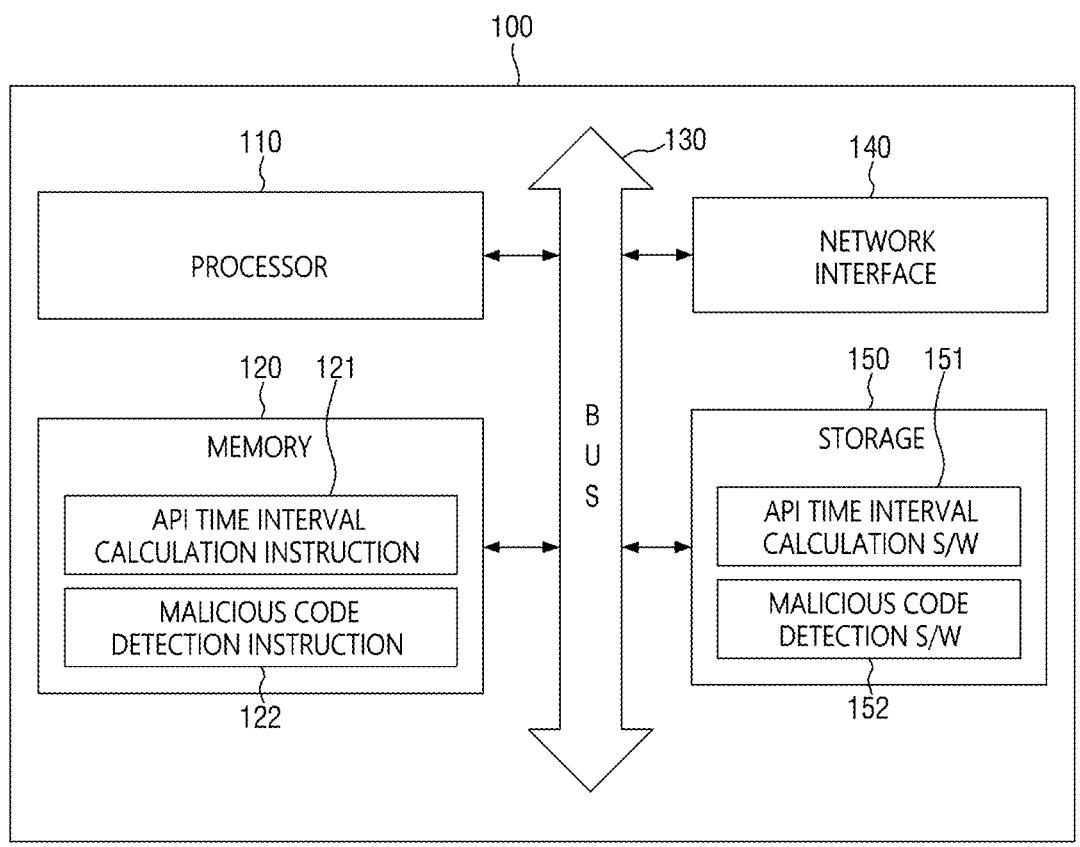
FIG. 14 is a table for comparing results of the malicious code detection method of the present disclosure and results of a malicious code detection method according to a related art.
FIG. 15 is a hardware block diagram of a device for detecting a malicious code according to another exemplary embodiment of the present disclosure.

FIG. 13 is a set of graphs illustrating analysis results of malicious codes and time intervals detected by the malicious code detection method of the present disclosure, and FIG. 14 is a table for comparing results of the malicious code detection method of the present disclosure and results of a malicious code detection method of a related art.

Referring to FIG. 13, various malicious codes were detected in an information protection challenge file of Korea Internet and Security Agency (KISA) according to the malicious code detection method of the present disclosure. In each graph, the horizontal axis denotes a time according to the API call sequence of a detected malicious code, and the vertical axis denotes a time interval. Time intervals were acquired as shown in the graphs. It is seen in the graphs shown in FIG. 13 that similar time intervals are acquired from the same type of malicious codes. Consequently, it is meaningful to extract time intervals as a feature from a malicious code.

FIG. 14 shows results obtained by performing the malicious code detection method of the present disclosure on files 2 each of which represents a unique value using message-digest algorithm 5 (MD5) which is a 128-bit cryptographic hash function. The files 2 are determined to be normal as a result 3 of malicious code detection acquired with existing analysis equipment. However, a malicious code is detected in all the files 2 as a result 4 of malicious code detection acquired with the malicious code detection method of the present disclosure.

In a final verification operation S, it is determined that a malicious code is actually present in the files 2. A test of detecting a malicious code in an information protection challenge file of LISA and a file directly acquired from a security management server was performed three times with random sampling through the malicious code detection method of the present disclosure. The malicious code detection method showed 93% in all accuracy, precision, and recall, and thus an increase in accuracy in malicious code detection was confirmed.

The above-described methods according to the exemplary embodiments of the present disclosure may be performed by executing a computer program implemented as a computer-readable code. The computer program may be transmitted from a first computing device to a second computing device through a network, such as the Internet, installed on the second computing device, and thus may be used in the second computing device. The first computing device and the second computing device include all fixed computing devices such as a server device, a physical server belonging to a server pool for a cloud game service, and a desktop personal computer (PC).

The computer program may be stored in recording media such as a digital versatile disc (DVD) read-only memory (ROM) and a flash memory.

A malicious code detection model training device 100 according to another exemplary embodiment of the present disclosure will be described below with reference to FIG. 15.

Referring to FIG. 15, the malicious code detection model training device 100 may include at least one processor 110, a memory 120 to which an API time interval calculation program 151 and a malicious code detection program 152 executed by the processor 110 are loaded, a bus 130, a network interface 140, and a storage 150 which stores the API time interval calculation program 151 and the malicious code detection program 152. FIG. 15 shows only elements related to embodiments of the present disclosure. Therefore, those of ordinary skill in the art will appreciate that general elements other than those shown in FIG. 15 may be further included.

The processor 110 controls overall operation of each element of the malicious code detection model training device 100. The processor 110 may be configured to include a CPU, a microprocessor unit (MPU), a microcontroller unit (MCU), a graphics processing unit (GPU), or any form of processor well known in the technical field of the present disclosure. The processor 110 may perform calculation for at least one application or program for executing methods according to embodiments of the present disclosure. Although the malicious code detection model training device 100 shown in FIG. 15 includes one processor 110, the malicious code detection model training device 100 is not limited thereto and may include a plurality of processors.

The memory 120 stores various kinds of data, commands, and/or information. To execute methods or operations according to various embodiments of the present disclosure, the memory 120 may load the API time interval calculation program 151 and the malicious code detection program 152 from the storage 150. When the API time interval calculation program 151 and the malicious code detection program 152 are loaded to the memory 120, the processor 110 may perform the malicious code detection model training method, the malicious code detection method, or operations thereof by executing one or more instructions 121 and 122 constituting the API time interval calculation program 151 and the malicious code detection program 152. The memory 120 may be implemented as a volatile memory such as a random access memory (RAM), hut the technical scope of the present disclosure is not limited thereto.

The bus 130 provides a communication function between elements of the malicious code detection model training device 100. The bus 130 may be implemented as various forms of buses such as an address bus, a data bus, and a control bus.

The network interface 140 supports wired and wireless Internet communication of the malicious code detection model training device 100. Also, the network interface 140 may support various communication methods as well as Internet communication. To this end, the network interface 140 may include a communication module well known in the technical field of the present disclosure. In some embodiments, the network interface 140 may be omitted.

The storage 150 may non-temporarily store the API time interval calculation program 151 and the malicious code detection program 152. When an application program is executed and manipulated through the malicious code detection model training device 100, the storage 150 may store various kinds of data about the executed application program according to the execution and manipulation. For example, the storage 150 may store information on the executed application program, manipulation information of the application program, and information on a user who requests execution of the application program.

The storage 150 may include a non-volatile memory, such as a ROM, an erasable programmable ROM (EPROM), an electrically erasable programmable ROM (EEPROM), and a flash memory, a hard disc, a removable disc, or any form of computer-readable recording medium well known in the technical field of the present disclosure.

The API time interval calculation program 151 and the malicious code detection program 152 may include the one or more instructions 121 and 122 which cause the processor 110 to perform methods or operations according to various embodiments of the present disclosure when loaded to the memory 120. In other words, the processor 110 may perform the methods or operations according to the various embodiments of the present disclosure by executing the one or more instructions 121 and 122.

According to an exemplary embodiment, the API time interval calculation program 151 and the malicious code detection program 152 may include an instruction to acquire API call information of called functions from a result log of performing dynamic analysis of a malicious code, an instruction to calculate time intervals between timestamps using the timestamps which indicate API call times extracted from the API call information, an instruction to determine a malicious code feature value on the basis of the time intervals, and an instruction to train the malicious code detection model using an API call sequence included in the API call information and the feature value.

So far, various embodiments of the present inventive concept and effects according to the embodiments have been mentioned with reference to FIGS. 1 to 15. The effects according to the technical idea of the present inventive concept are not limited to the above-mentioned effects, and other effects that are not mentioned will be clearly understood by those skilled in the art from the following description.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A method of training a malicious code detection model performed by a computing device, the method comprising:
    acquiring application programming interface (API) call information of called functions from a result log of performing dynamic analysis of a malicious code;
    calculating time intervals between timestamps using the timestamps which indicate API call times extracted from the API call information;
    determining a feature value of the malicious code on the basis of the time intervals; and
    training the malicious code detection model using an API call sequence included in the API call information and the feature value,
    wherein the calculating of the time intervals comprises:
        generating a list storing the API call sequence of a file for which malicious code detection is requested and the timestamps;
        dividing the list into sections of arbitrary sizes;
        determining a feature value in each of the divided sections of the arbitrary sizes of the list;
        performing a simulation of detecting the malicious code using the feature values; and
        dividing the list including the time intervals into sections of the optimal sizes determined based on the results of the simulation,
    wherein the determining of the feature value of the malicious code comprises analyzing the time intervals in each of the divided sections.

2. The method of claim 1, wherein the feature value comprises at least one of a maximum value of the time intervals, an average value of the time intervals, and a standard deviation of the time intervals in the list including the time intervals.

3. The method of claim 1, wherein the determining of the feature value indicating a feature of the malicious code comprises additionally using additional information of a file, for which malicious code detection is requested, in the result log of performing the dynamic analysis to determine the feature value.

4. The method of claim 3, wherein the additional information includes at least one of types or a number of changes of dynamic-link libraries (dlls), a number of changes in a process identifier (ID), a central processing unit (CPU) value, or telemetry data.

5. The method of claim 1, further comprising performing a preprocess of unifying names of functions which are determined to be similar functions among functions included in the API call information.

6. A method of detecting a malicious code performed by a computing device, the method comprising:
    acquiring application programming interface (API) call information of called functions from a result log of performing dynamic analysis of a malicious code;
    calculating time intervals between timestamps using the timestamps which indicate API call times extracted from the API call information;
    determining a feature value indicating a feature of the malicious code on the basis of the time intervals; and
    detecting the malicious code in a file, for which malicious code detection is requested, through a malicious code detection model,
    wherein the malicious code detection model learns the feature value of the malicious code using an API call sequence included in the API call information and the feature value,
    wherein the calculating the time intervals comprises:
        generating a list storing the API call sequence of a file for which malicious code detection is requested and the timestamps;
        dividing the list into sections of arbitrary sizes;
        determining a feature value in each of the divided sections of the arbitrary sizes of the list;
        performing a simulation of detecting the malicious code using the feature values; and
        dividing the list including the time intervals into sections of the optimal sizes determined based on the results of the simulation,
    wherein the determining of the feature value of the malicious code comprises analyzing the time intervals in each of the divided sections.

7. A device for training a malicious code detection model, the device comprising:
    a processor;
    a network interface;
    a memory; and
    a computer program configured to be loaded to the memory and executed by the processor,
    wherein the computer program comprises:
        an instruction to acquire application programming interface (API) call information of called functions from a result log of performing dynamic analysis of a malicious code;

an instruction to calculate time intervals between timestamps using the timestamps which indicate API call times extracted from the API call information;

an instruction to determine a feature value of the malicious code on the basis of the time intervals; and an instruction to train a malicious code detection model using an API call sequence included in the API call information and the feature value, wherein the instruction to calculate the time intervals comprises:

an instruction to generate a list storing the API call sequence of a file for which malicious code detection is requested and the timestamps;

an instruction to divide the list into sections of arbitrary sizes;

an instruction to determine a feature value in each of the divided sections of the arbitrary sizes of the list;

an instruction to perform a simulation of detecting the malicious code using the feature values; and an instruction to divide the list including the time intervals into sections of the optimal sizes determined based on the results of the simulation, wherein the instruction to determine the feature value of the malicious code comprises analyzing the time intervals in each of the divided sections.

8. The device of claim 7, wherein the feature value includes at least one of a maximum value of the time intervals, an average value of the time intervals, and a standard deviation of the time intervals in the list including the time intervals.

9. The device of claim 7, wherein the instruction to determine the feature value of the malicious code comprises an instruction to determine the feature value additionally using additional information of a file, for which malicious code detection is requested, in the result log of performing the dynamic analysis.

10. The device of claim 7, further comprising an instruction to perform a preprocess of unifying names of functions which are determined to be similar functions among functions included in the API call information.

* * * * *